(12) United States Patent
Jussila et al.

(10) Patent No.: US 9,484,837 B2
(45) Date of Patent: Nov. 1, 2016

(54) SWITCHING BRANCH FOR THREE-LEVEL INVERTER AND METHOD FOR CONTROLLING SWITCHING BRANCH OF THREE-LEVEL INVERTER

(71) Applicant: ABB Technology Oy, Helsinki (FI)

(72) Inventors: Matti T. Jussila, Vantaa (FI); Tero Viitanen, Vantaa (FI)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 14/827,967

(22) Filed: Aug. 17, 2015

(65) Prior Publication Data
US 2016/0056732 A1   Feb. 25, 2016

(30) Foreign Application Priority Data

Aug. 21, 2014  (EP) .................................... 14181776

(51) Int. Cl.
*H02M 7/537* (2006.01)
*H02M 7/487* (2007.01)

(52) U.S. Cl.
CPC ............ *H02M 7/537* (2013.01); *H02M 7/487* (2013.01)

(58) Field of Classification Search
CPC ........... H02M 3/1582; H02M 3/1584; H02M 3/285; H02M 3/33561; H02M 7/49; H02M 7/493; H02M 7/537
USPC ............ 363/65, 71, 74, 78, 95, 97, 98, 123, 363/124, 131, 132
See application file for complete search history.

(56) References Cited

U.S. PATENT DOCUMENTS 6,697,274 B2 *  2/2004  Bernet .................. H02M 7/487
                                                      363/132

FOREIGN PATENT DOCUMENTS

DE    10201008426 A1    8/2011
EP       2456059 A1    5/2012
EP       2662966 A1   11/2013

OTHER PUBLICATIONS

European Patent Office, European Search Report issued in European Patent Application No. 14181776.7 dated Feb. 10, 2015, 7 pp.

* cited by examiner

*Primary Examiner* — Adolf Berhane
*Assistant Examiner* — Afework Demisse
(74) *Attorney, Agent, or Firm* — Taft Stettinius & Hollister LLP

(57) ABSTRACT

A switching branch for a three-level inverter, comprising a first and second switch (S1, S2) in series between a positive DC pole (P) and an AC pole (AC), a first and second diode (D1, D2) parallel to the first and second switches, a third and fourth switch (S3, S4) in series between a negative DC pole (N) and the AC pole, a third and fourth diode (D3, D4) parallel to the third and fourth switches, a fifth diode (D5) between a neutral DC pole (M) and a point between the first and second switches, a sixth diode (D6) between the neutral DC pole and a point between the third and fourth switches, a fifth switch (S5) and a seventh diode (D7) in series between the neutral DC and AC poles, and a sixth switch (S6) and an eighth diode (D8) in series between the neutral DC and AC poles.

14 Claims, 3 Drawing Sheets

US 9,484,837 B2

SWITCHING BRANCH FOR THREE-LEVEL INVERTER AND METHOD FOR CONTROLLING SWITCHING BRANCH OF THREE-LEVEL INVERTER

FIELD OF THE INVENTION

The invention relates to a switching branch for a three-level inverter, and a method for controlling a switching branch of a three-level inverter.

BACKGROUND OF THE INVENTION

Three-level converters, such as inverters and/or rectifiers, are converters that have three DC poles. In addition to positive and negative DC poles, they have a neutral DC pole. Three-level converter topologies may be used in order to obtain higher DC voltage levels and to reduce a need for output current filtering, for example. Examples of three-level neutral-point-clamped converters are given in T. Brückner, S. Bernet and H. Güldner, "The Active NPC Converter and Its Loss-Balancing Control", IEEE transactions on industrial electronics, Vol. 52, No. 3, June 2005. In particular, examples of three-level neutral-point-clamped (NPC) converters and active neutral-point-clamped (ANPC) converters are given.

FIG. 1 shows an example of a main circuit of a three-level NPC inverter. The exemplary three-level inverter is a three-phase inverter and thus comprises three switching branches 101, 102, 103 each comprising six diodes and four controllable semiconductor switches. During operation of the inverter the controllable semiconductor switches may be controlled according to a modulation scheme to be used. The exemplary inverter further comprises a positive direct current pole P, a negative direct current pole N and a neutral direct current pole M for connecting the inverter to a DC supply (not shown), such as a DC intermediate circuit. The exemplary inverter further comprises three alternating current poles AC1, AC2, AC3 for supplying a three-phase power system (not shown), for example.

A possible problem related to the above solution is that, especially when the power level of the three-level inverter increases, the commutation loops formed in the three-level inverter may become non-optimal and possibly resulting stray inductances may generate harmful voltage spikes during current commutation between components of the inverter. One particular example of this is when a voltage polarity of the alternating current pole AC1, AC2, AC3 of a switching branch 101, 102, 103 of the three-level inverter is to be changed from positive to negative or from negative to positive and the current is commutated from the upper half of the switching branch to the lower half or from the lower half of the switching branch to the upper half, respectively. In this situation harmful voltage spikes can occur. Similar harmful commutations can occur when the modulated voltage and the output AC current have opposite polarities. One solution to this problem would be to use clamp or snubber circuits to suppress such voltage spikes. However, such circuits may be costly and the operating range may still be limited when compared to a nominal current of the semiconductor switches.

BRIEF DESCRIPTION OF THE INVENTION

An object of the invention is to provide an apparatus and a method so as to solve or at least alleviate the above problem. The object of the invention is achieved by a switching branch for a three-level inverter, an inverter, a method, and a computer program product that are characterized by what is stated in the independent claims. Preferred embodiments of the invention are described in the dependent claims.

The invention is based on the idea of providing additional switch connections to both the upper half and the lower half of the switching branch so that the current can be commutated within the half of the switching branch in question regardless of the current polarity.

The solution of the invention provides the advantage that expensive and lossy clamp or snubber circuits are no longer needed or they can be reduced in order to suppress voltage spikes during current commutation between the halves of the switching branch even at higher power levels. Also the main circuit busbar design becomes easier, since typical commutations do not take place between the upper and the lower half modules.

BRIEF DESCRIPTION OF THE FIGURES

The invention will now be explained in greater detail in connection with preferred embodiments and with reference to the attached drawings, in which.

DETAILED DESCRIPTION OF THE INVENTION

The application of the invention is not restricted to any specific system, but it may be applied to various electric systems. In addition, the use of the invention is not restricted to any system utilizing a specific basic frequency or to any specific voltage level.

Figure 1:
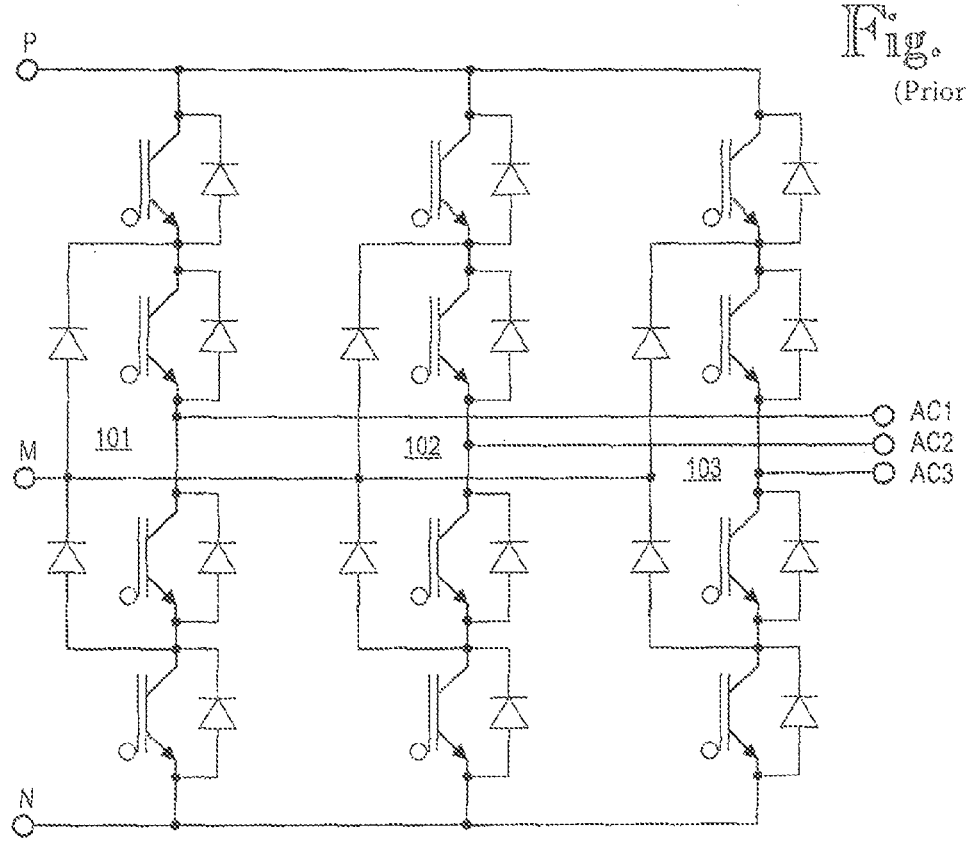
FIG. 1 shows a circuit diagram of a main circuit of a three-phase three-level inverter according to an embodiment.
Figure 2:
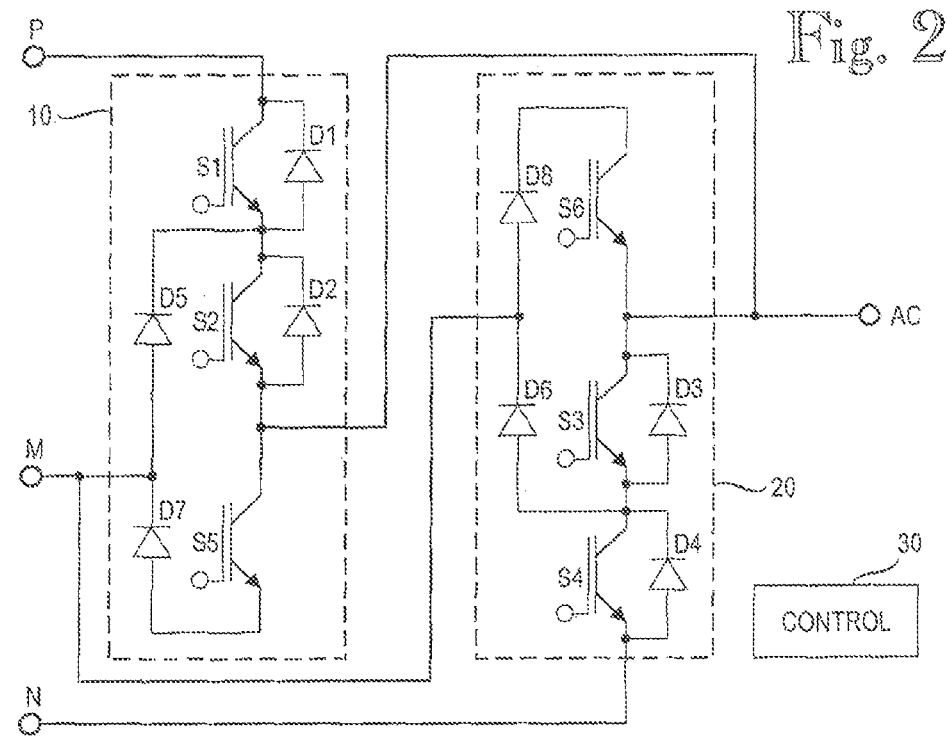
FIG. 2 shows a circuit diagram of a switching branch of a three-level inverter according to an embodiment.

FIG. 2 shows a circuit diagram of a switching branch for a three-level inverter in accordance with an embodiment. It should be noted that the figure only presents elements essential to the understanding of the invention. The switching branch may be one switching branch of a multi-phase inverter, such as a three-phase inverter, or a switching branch of a one-phase inverter, for example. The switching branch of FIG. 2 comprises an alternating current pole AC, a positive direct current pole P, a negative direct current pole N, and a neutral direct current pole M. Further, the switching branch comprises a first controllable semiconductor switch S1 and a second controllable semiconductor switch S2 connected in series between the positive direct current pole P and the alternating current pole AC of the switching branch, wherein the first controllable semiconductor switch S1 is connected to the positive direct current pole P. A first diode D1 is connected in parallel to the first controllable semiconductor switch S1 and a second diode D2 is connected in parallel to the second controllable semiconductor switch S2. Further, the switching branch comprises a third controllable semiconductor switch S3 and a fourth controllable semiconductor switch S4 connected in series between the negative direct current pole N and the alternating current pole AC of the switching branch, wherein the fourth controllable semiconductor switch S4 is connected to the negative direct current pole N. A third diode D3 is connected in parallel to the third controllable semiconductor switch S3, and a fourth diode D4 is connected in parallel to the fourth controllable semiconductor switch S4. Further, the switching branch comprises a fifth diode D5 connected between the neutral direct current pole M and a connection point between the first controllable semiconductor switch S1 and the second controllable semiconductor switch S2, and a sixth diode D6 connected between the neutral direct current pole M and a connection point between the third controllable semiconductor switch S3 and the fourth controllable semiconductor switch S4. Moreover, the switching branch comprises a fifth controllable semiconductor switch S5 and a seventh diode D7 connected in series between the neutral direct current pole M and the alternating current pole AC of the switching branch and a sixth controllable semiconductor switch S6 and an eighth diode D8 connected in series between the neutral direct current pole M and the alternating current pole AC of the switching branch. The upper half of the switching branch of FIG. 2 thus comprises the first controllable semiconductor switch S1, the second controllable semiconductor switch S2, the fifth controllable semiconductor switch S5, the first diode D1, the second diode D2, the fifth diode D5, and the seventh diode D7. The lower half of the switching branch of FIG. 2 thus comprises the third controllable semiconductor switch S3, the fourth controllable semiconductor switch S4, the sixth controllable semiconductor switch S6, the third diode D3, the fourth diode D4, the sixth diode D6, and the eighth diode D8. The controllable semiconductor switches S1 to S6 can be IGBTs (Insulated Gate Bipolar Transistor) or FETs (Field-Effect Transistor) or any corresponding controllable semiconductor switches. FIG. 2 further shows a control arrangement 30 by or via which the switches S1 to S6 can be controlled. The control of the semiconductor switches S1 to S6 can involve one or more additional control components (not shown).

Two or more of the semiconductor components of the switching branch may be provided in a semiconductor module. In this context, the term 'semiconductor module' generally refers to a module that comprises two or more semiconductor elements arranged on a common substrate and connected electrically to each other in a suitable manner.

Figure 3:
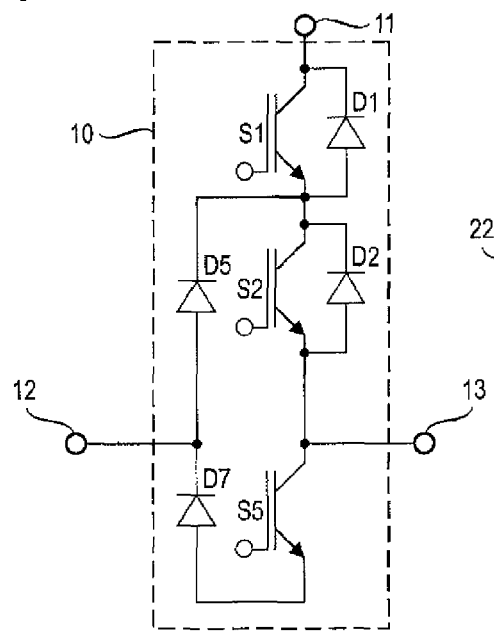
FIG. 3 shows an example of a semiconductor module structure.
Figure 4:
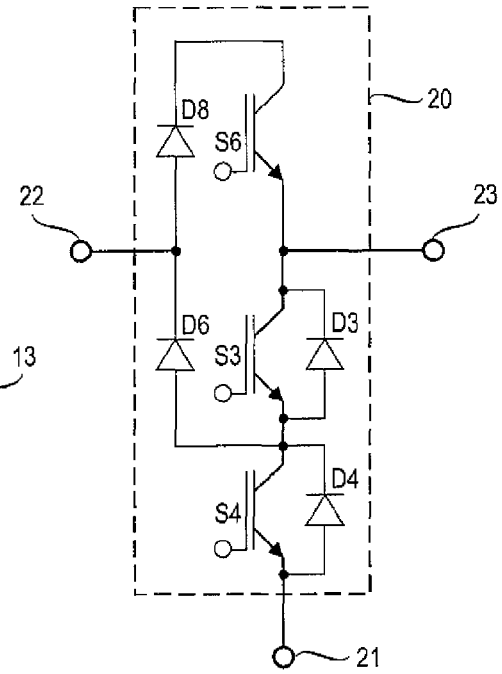
FIG. 4 shows an example of a semiconductor module structure.

According to an embodiment, as shown in the example of FIG. 2, the first controllable semiconductor switch S1, the second controllable semiconductor switch S2, the fifth controllable semiconductor switch S5, the first diode D1, the second diode D2, the fifth diode D5, and the seventh diode D7 reside in a first switching branch-specific semiconductor module 10. Moreover, the third controllable semiconductor switch S3, the fourth controllable semiconductor switch S4, the sixth controllable semiconductor switch S6, the third diode D3, the fourth diode D4, the sixth diode D6, and the eighth diode D8 reside in a second switching branch-specific semiconductor module 20. FIG. 3 further illustrates a possible configuration of the first semiconductor module 10 separately. The exemplary first semiconductor module 10 comprises a positive direct current terminal 11, a neutral direct current terminal 12 and an alternating current terminal 13 for connecting the module 10. In a similar manner, FIG. 4 further illustrates a possible configuration of the second semiconductor module 20 separately. The exemplary second semiconductor module 20 comprises a negative direct current terminal 21, a neutral direct current terminal 22 and an alternating current terminal 13 for connecting the module 20. Thus, the semiconductor components of the switching branch may be divided into two, three or even more semiconductor modules. This may be preferable in case of higher power levels. In particular, when the above division of the semiconductor components into two, i.e., the first and second semiconductor modules 10, 20 is combined with the idea of providing the additional switch connections, i.e. S5+D7 and S6+D8, to both the upper half and the lower half of the switching branch, respectively, it is possible to commutate the current within a semiconductor module 10, 20 regardless of the current polarity.

Figure 5:
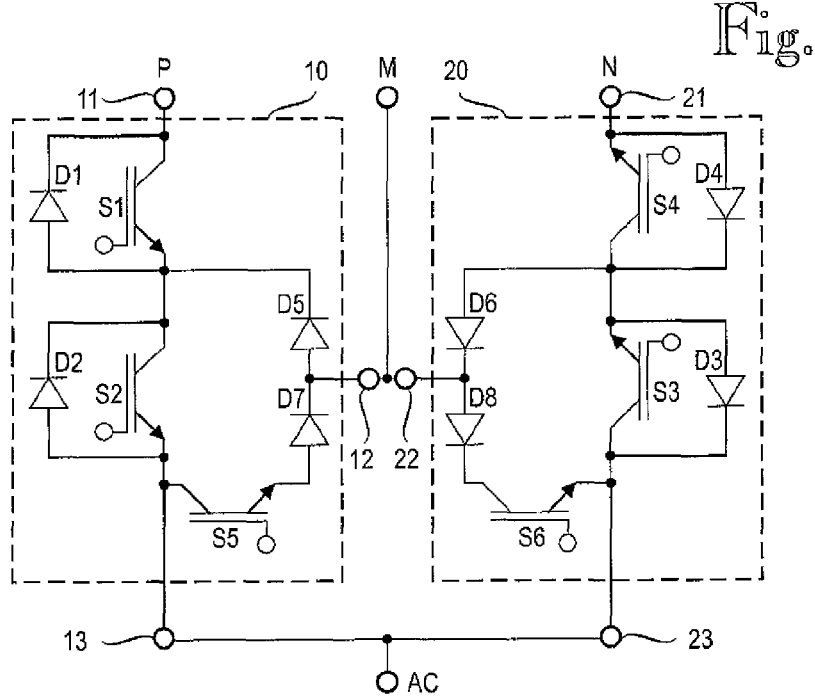
FIG. 5 shows a circuit diagram and a physical layout of a switching branch of a three-level inverter according to an embodiment.

In case the switching branch comprises two semiconductor modules as described above, it is preferable to optimize the physical positions of module terminals with respect to each other. FIG. 5 illustrates an example of the circuit diagram and a possible physical layout of the switching branch according to an embodiment. The example of FIG. 5 comprises the first and second semiconductor modules 10, 20 such that the positive direct current terminal 11 of the first semiconductor module 10 forms the positive direct current pole P of the switching branch, the negative direct current terminal 21 of the second semiconductor module 20 forms the negative direct current pole N of the switching branch, the neutral direct current terminals 12, 22 of the first and second semiconductor modules 10, 20 are connected together to form the neutral direct current pole M of the switching branch, and the alternating current terminals 13, 23 are connected together to form the alternating current pole AC of the switching branch. In order to make the commutation between the first and second semiconductor modules 10, 20 as easy and fast as possible, it is preferable to locate the neutral direct current terminals near each other. Thus, according to an embodiment, the first switching branch-specific semiconductor module 10 and the second switching branch-specific semiconductor module 20 are disposed next to each other such that the neutral direct current terminal 12 of the first switching branch-specific semiconductor module 10 is adjacent to the neutral direct current terminal 22 of the second switching branch-specific semiconductor module 20, as illustrated in FIG. 5. Moreover, for easy and efficient mechanical layout design, the alternating current terminals of the semiconductor modules 10, 20 are preferably located on the same side. Thus, according to an embodiment, the alternating current terminal 13 of the first switching branch-specific semiconductor module 10 and the alternating current terminal 23 of the second switching branch-specific semiconductor module 20 are located on the same side of the switching branch, as illustrated in FIG. 5. In a similar manner, it is preferable that the DC link potentials of the semiconductor modules 10, 20 should be relatively near each other in order to minimize stray inductances of the DC link busbars. Thus, according to an embodiment, the positive direct current terminal 11 of the first switching branch-specific semiconductor module 10 and the negative direct current terminal 21 of the second switching branch-specific semiconductor module 20 are located on the same side of the switching branch, as illustrated in FIG. 5. It should be noted, however, that FIG. 5 shows only one possible example of the physical layout of the semiconductor modules 10, 20.

Figure 6:
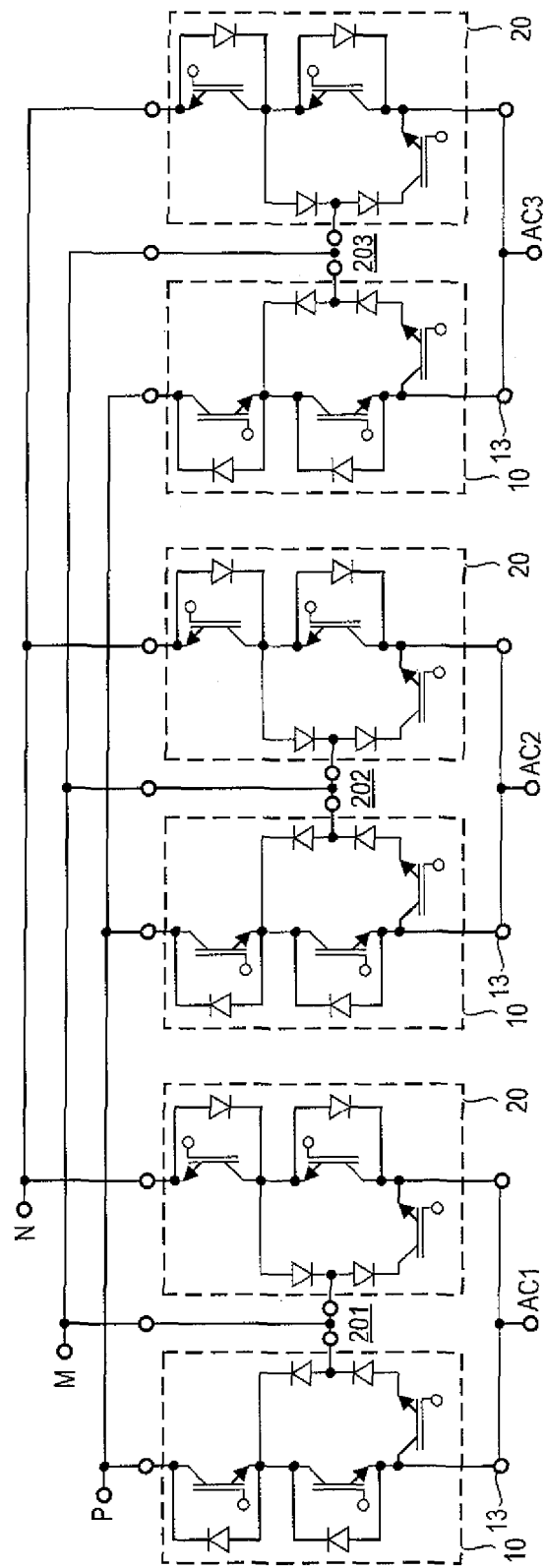
FIG. 6 shows a circuit diagram and a physical layout of a main circuit of a three-phase three-level inverter according to an embodiment.

According to an embodiment, a multi-phase three-level inverter can be implemented by connecting together at least three switching branches according to any embodiment described above. For example, a three-phase three-level inverter can be implemented by connecting together three switching branches according to any embodiment described above. FIG. 6 illustrates an exemplary circuit diagram and a physical layout of a three-phase three-level inverter according to an embodiment comprising three switching branches 201, 202, 203 corresponding to that of FIG. 5 with three alternating current poles AC1, AC2 and AC3, respectively. In the example, the three switching branches 201, 202, 203 have been connected together by connecting the positive direct current poles P of each switching branch together, the negative direct current poles N of each switching branch together, and the neutral direct current poles M of each switching branch together. For the sake of clarity, FIG. 6 does not show the control arrangements for the semiconductor switches.

According to an embodiment, the switching branch for the three-level inverter according to any one of the embodiments above may be controlled as follows:

a) when the voltage polarity of the alternating current pole AC of the switching branch is to be changed from positive to negative, first, the first controllable semiconductor switch S1 is controlled to turn OFF;

then the second controllable semiconductor switch S2, the fifth controllable semiconductor switch S5, the third controllable semiconductor switch S3 and the sixth controllable semiconductor switch S6 are controlled to turn ON (not necessarily simultaneously but one or some can be turned ON earlier than the others); and after the current supplied to the alternating current pole AC of the switching branch has commutated to the neutral direct current pole M, the second controllable semiconductor switch S2 and the fifth controllable semiconductor switch S5 are controlled to turn OFF (not necessarily simultaneously but one can be turned OFF earlier than the other), and b) when the polarity of the alternating current pole AC of the switching branch is to be changed from negative to positive, first, the fourth controllable semiconductor switch S4 is controlled to turn OFF;

then the second controllable semiconductor switch S2, the fifth controllable semiconductor switch S5, the third controllable semiconductor switch S3 and the sixth controllable semiconductor switch S6 are controlled to turn ON (not necessarily simultaneously but one or some can be turned ON earlier than the others); and after the current supplied to the alternating current pole AC of the switching branch has commutated to the neutral direct current pole M, the third controllable semiconductor switch S3 and the sixth controllable semiconductor switch S6 are controlled to turn OFF (not necessarily simultaneously but one can be turned OFF earlier than the other).

According to an embodiment, the switching branch of the three-level inverter according to any of the embodiments herein may be controlled such that there is an appropriate commutation delay between turn ON and turn OFF of two or more controllable semiconductor switches. Further, when two or more controllable semiconductor switches are controlled to turn ON or OFF in the operational states described herein, there may be a delay between the turn ON events or turn OFF events. Eventually, there may be controllable semiconductor switch specific turn ON and turn OFF delays which may have different time values depending on the operation point or mode. The delay can also be zero if appropriate.

By using the above control procedure the commutation between the upper and lower halves of the switching branch (or the commutation between the first and second semiconductor modules in case of a switching branch comprising two semiconductor modules) during normal operation of the switching branch does not generate harmful voltage spikes as the change of polarity is done via the midpoint with a long-enough commutation time. In the above procedure, the information on whether the current supplied to the alternating current pole AC of the switching branch is commuted to the neutral direct current pole M may be based on known delay times of the switching branch circuit. After it is sure, e.g. based on known circuit delays, that the current is commuted to the switches modulated and conducting after the polarity change, the modulation of the controllable semiconductor switches may continue normally according to the modulation scheme used. Thus, when the negative or positive output voltage polarity is modulated outside the polarity change procedure described above, it may always be done by using the controllable semiconductor switches of only either the upper half of the switching branch (during the positive half of the output phase voltage of the switching branch) or the lower half of the switching branch (during the negative half of the output phase voltage of the switching branch). Accordingly, in case of a switching branch comprising two semiconductor modules 10, 20, when the negative or positive output voltage polarity is modulated outside the polarity change procedure described above, it may always be done by using the controllable semiconductor switches of only either the first semiconductor module 10 (during the positive half of the output phase voltage of the switching branch) or the second semiconductor module 20 (during the negative half of the output phase voltage of the switching branch). As an example, the switching branch of the three-level inverter according to any of the embodiments above may be controlled as follows:

a) When the inverter is commanded to produce a positive phase voltage, the alternating current pole AC is periodically connected to the positive direct current pole P or the neutral direct current pole M by means of the applied pulse width modulation (PWM) method, for example. For example, if the alternating current pole AC is to be connected to the positive direct current pole P, the first and the second controllable semiconductor switches S1, S2 may be controlled to turn ON (S3 and S4 are OFF). In a similar manner, if the alternating current pole AC is to be connected to the neutral direct current pole M, the first controllable semiconductor switch S1 may be controlled to turn OFF and the second and/or the fifth controllable semiconductor switches S2, S5 may be controlled to turn ON. It should be noted that if the current polarity of the alternating current pole AC is further considered, only the necessary controllable semiconductor switches need to be controlled ON and OFF for a proper electrical connection between the alternating current pole AC and the positive direct current pole P or the alternating current pole AC and the neutral direct current pole M, since the diodes can act as current polarity dependent semiconductor switches.

b) When the inverter is commanded to produce a negative phase voltage, the alternating current pole AC is periodically connected to the negative direct current pole N or the neutral direct current pole M by means of the applied pulse width modulation (PWM) method, for example. For example, if the alternating current pole AC is to be connected to the negative direct current pole N, the third and the fourth controllable semiconductor switches S3, S4 may be controlled to turn ON (S1 and S2 are OFF). In a similar manner, if the alternating current pole AC is to be connected to the neutral direct current pole M, the fourth controllable semiconductor switch S4 may be controlled to turn OFF and the third and/or the sixth controllable semiconductor switches S3, S6 may be controlled to turn ON. It should be noted that if the current polarity of the alternating current pole AC is further considered, only the necessary controllable semiconductor switches need to be controlled ON and OFF for a proper electrical connection between the alternating current pole AC and the negative direct current pole N or the alternating current pole AC and the neutral direct current pole M, since the diodes can act as current polarity dependent semiconductor switches.

The control of the controllable semiconductor switches according to the various embodiments described above can be performed by or via the control arrangement 30, which can also perform the normal modulation control of the switches. It is also possible to use additional or separate logical or physical units (not shown) for performing the control functionality. The control functionality could, for example, be implemented using a separate logic arrangement, which could be independent of the normal modulation control of the switches, for example.

The control arrangement 30 and/or a separate logic arrangement controlling the controllable semiconductor switches according to any one of the above embodiments, or a combination thereof, can be implemented as one unit or as two or more separate units that are configured to implement the functionality of the various embodiments. Here the term 'unit' refers generally to a physical or logical entity, such as a physical device or a part thereof, or a software routine. The control arrangement 30 according to any one of the embodiments may be implemented at least partly by means of one or more computers or corresponding digital signal processing (DSP) equipment provided with suitable software, for example. Such computer or digital signal processing equipment preferably comprises at least a working memory (RAM) providing storage area for arithmetical operations and a central processing unit (CPU), such as a general-purpose digital signal processor. The CPU may comprise a set of registers, an arithmetic logic unit, and a CPU control unit. The CPU control unit is controlled by a sequence of program instructions transferred to the CPU from the RAM. The CPU control unit may contain a number of microinstructions for basic operations. The implementation of the microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus possibly implementing the invention, or a part thereof, may further comprise suitable input means for receiving e.g. measurement and/or control data, and output means for outputting e.g. control data. It is also possible to use analog circuits, programmable logic devices (PLD), or discrete electric components and devices for implementing the functionality according to any one of the embodiments. For example, the control arrangement 30 according to any one of the embodiments may be implemented at least partly by means of such analog circuits or programmable logic devices.

The control functionality can be implemented in existing system elements or by using separate dedicated elements or devices in a centralized or distributed manner. Present inverter switching branches or inverters, for example, can comprise programmable logic devices or processors and memory that can be utilized in the functions according to various embodiments described above. Thus, all modifications and configurations required for implementing an embodiment e.g. in existing inverter switching branches or inverters may be performed as software routines, which may be implemented as added or updated software routines. If at least part of the control functionality is implemented by software, such software can be provided as a computer program product comprising computer program code which, when run on a computer, causes the computer or a corresponding arrangement to perform the functionality according to the embodiments as described above. Such a computer program code may be stored or generally embodied on a computer readable medium, such as a suitable memory, e.g. a flash memory or an optical memory, from which it is loadable to the unit or units executing the program code. In addition, such a computer program code may be loaded to the unit or units executing the computer program code via a suitable data network, for example, and it may replace or update a possibly existing program code.

It is obvious to a person skilled in the art that, as technology advances, the basic idea of the invention may be implemented in various ways. The invention and its embodiments are thus not restricted to the above examples but may vary within the scope of the claims.

The invention claimed is:

1. A switching branch for a three-level inverter, the switching branch comprising:
   a first controllable semiconductor switch and a second controllable semiconductor switch connected in series between a positive direct current pole and an alternating current pole of the switching branch, wherein the first controllable semiconductor switch is connected to the positive direct current pole;
   a first diode connected in parallel to the first controllable semiconductor switch, and a second diode connected in parallel to the second controllable semiconductor switch;
   a third controllable semiconductor switch and a fourth controllable semiconductor switch connected in series between a negative direct current pole and the alternating current pole of the switching branch, wherein the fourth controllable semiconductor switch is connected to the negative direct current pole;
   a third diode connected in parallel to the third controllable semiconductor switch, and a fourth diode connected in parallel to the fourth controllable semiconductor switch;
   a fifth diode connected between a neutral direct current pole and a connection point between the first and second controllable semiconductor switches;
   a sixth diode connected between the neutral direct current pole and a connection point between the third and fourth controllable semiconductor switches;
   a fifth controllable semiconductor switch and a seventh diode connected in series between the neutral direct current pole and the alternating current pole of the switching branch; and
   a sixth controllable semiconductor switch and an eighth diode connected in series between the neutral direct current pole and the alternating current pole of the switching branch,
   wherein the first controllable semiconductor switch, the second controllable semiconductor switch, the fifth controllable semiconductor switch, the first diode, the second diode, the fifth diode, and the seventh diode reside in a first switching branch-specific semiconductor module; and the third controllable semiconductor switch, the fourth controllable semiconductor switch, the sixth controllable semiconductor switch, the third diode, the fourth diode, the sixth diode, and the eighth diode reside in a second switching branch-specific semiconductor module.

2. The switching branch for the three-level inverter of claim 1, wherein the first switching branch-specific semiconductor module and the second switching branch-specific semiconductor module are disposed next to each other such that a neutral direct current terminal of the first switching branch-specific semiconductor module is adjacent to a neutral direct current terminal of the second switching branch-specific semiconductor module.

3. The switching branch for the three-level inverter of claim 2, wherein an alternating current terminal of the first switching branch-specific semiconductor module and an alternating current terminal of the second switching branch-specific semiconductor module are located on the same side of the switching branch.

4. The switching branch for the three-level inverter of claim 2, wherein a positive direct current terminal, of the first switching branch-specific semiconductor module and a negative direct current terminal of the second switching branch-specific semiconductor module are located on the same side of the switching branch.

5. The switching branch for the three-level inverter of claim 3, wherein a positive direct current terminal of the first switching branch-specific semiconductor module and a negative direct current terminal of the second switching branch-specific semiconductor module are located on the same side of the switching branch.

6. The switching branch for the three-level inverter of claim 1, comprising means for controlling the controllable semiconductor switches, wherein the means are configured to
  a) when a voltage polarity of the alternating current pole of the switching branch is to be changed from positive to negative,
  first, control the first controllable semiconductor switch to turn OFF;
  then control the second controllable semiconductor switch, the fifth controllable semiconductor switch, the third controllable semiconductor switch and the sixth controllable semiconductor switch to turn ON; and
  after the current supplied to the alternating current pole of the switching branch is commuted to the neutral direct current pole, control the second controllable semiconductor switch and the fifth controllable semiconductor switch to turn OFF, and
  b) when the polarity of the alternating current pole of the switching branch is to be changed from negative to positive,
  first, control the fourth controllable semiconductor switch to turn OFF;
  then control the second controllable semiconductor switch, the fifth controllable semiconductor switch, the third controllable semiconductor switch and the sixth controllable semiconductor switch to turn ON; and
  after the current supplied to the alternating current pole of the switching branch is commuted to the neutral direct current pole, control the third controllable semiconductor switch and the sixth controllable semiconductor switch to turn OFF.

7. The switching branch for the three-level inverter of claim 1, comprising a control arrangement for controlling the controllable semiconductor switches, the control arrangement comprising a processor and a memory storing instructions that, when executed by the processor,
  a) when a voltage polarity of the alternating current pole of the switching branch is to be changed from positive to negative,
  first control the first controllable semiconductor switch to turn OFF;
  then control the second controllable semiconductor switch, the fifth controllable semiconductor switch, the third controllable semiconductor switch and the sixth controllable semiconductor switch to turn ON; and
  after the current supplied to the alternating current pole of the switching branch is commuted to the neutral direct current pole, control the second controllable semiconductor switch and the fifth controllable semiconductor switch to turn OFF, and
  b) when the polarity of the alternating current pole of the switching branch is to be changed from negative to positive,
  first, control the fourth controllable semiconductor switch to turn OFF;
  then control the second controllable semiconductor switch, the fifth controllable semiconductor switch, the third controllable semiconductor switch and the sixth controllable semiconductor switch to turn ON; and
  after the current supplied to the alternating current pole of the switching branch is commuted to the neutral direct current pole, control the third controllable semiconductor switch and the sixth controllable semiconductor switch to turn OFF.

8. A multi-phase three-level inverter, which comprises at least three switching branches according to claim 1.

9. The multi-phase three-level inverter of claim 8, wherein the positive direct current poles of each switching branch are connected together, the negative direct current poles of each switching branch are connected together and the neutral direct current poles of each switching branch are connected together.

10. A method for controlling a switching branch of a three-level inverter, which switching branch comprises:
  a first controllable semiconductor switch and second controllable semiconductor switch connected in series between a positive direct current pole and an alternating current pole of the switching branch, wherein the first controllable semiconductor switch is connected to the positive direct current pole;
  a first diode connected in parallel to the first contra liable semiconductor switch, and a second diode connected in parallel to the second controllable semiconductor switch;
  a third controllable semiconductor switch and a fourth controllable semiconductor switch connected in series between a negative direct current pole and the alternating current pole of the switching branch, wherein the fourth controllable semiconductor switch is connected to the negative direct current pole;
  a third diode connected in parallel to the third controllable semiconductor switch, and a fourth diode connected in parallel to the fourth controllable semiconductor switch;
  a fifth diode connected between a neutral direct current pole and a connection point between the first and second controllable semiconductor switches;

a sixth diode connected between the neutral direct current pole and a connection point between the third and fourth controllable semiconductor switches;

a fifth controllable semiconductor switch and a seventh diode connected in series between the neutral direct current pole and the alternating current pole of the switching branch; and a sixth controllable semiconductor switch and an eighth diode connected in series between the neutral direct current pole and the alternating current pole of the switching branch, wherein the first controllable semiconductor switch, the second controllable semiconductor switch, the fifth controllable semiconductor switch, the first diode, the second diode, the fifth diode, and the seventh diode reside in a first switching branch-specific semiconductor module; and the third controllable semiconductor switch, the fourth controllable semiconductor switch, the sixth controllable semiconductor switch, the third diode, the fourth diode, the sixth diode, and the eighth diode reside in a second switching branch-specific semiconductor module, the method comprising:

a) when a polarity of the alternating current pole of the switching branch is to be changed from positive to negative, first, controlling the first controllable semiconductor switch to turn OFF;

then controlling the second controllable semiconductor switch, the fifth controllable semiconductor switch, the third controllable semiconductor switch and the sixth controllable semiconductor switch to turn ON; and after the current supplied to the alternating current pole of the switching branch is commuted to the neutral direct current pole, controlling the second controllable semiconductor switch and the fifth controllable semiconductor switch to turn OFF, and b) when the polarity of the alternating current pole of the switching branch is to be changed from negative to positive, first, controlling the fourth controllable semiconductor switch to turn OFF;

then controlling the second controllable semiconductor switch, the filth controllable semiconductor switch, the third controllable semiconductor switch and the sixth controllable semiconductor switch to turn ON; and after the current supplied to the alternating current pole of the switching branch is commuted to the neutral direct current pole, controlling the third controllable semiconductor switch and the sixth controllable semiconductor switch to turn OFF.

11. The method of claim 10, wherein the first switching branch-specific semiconductor module and the second switching branch-specific semiconductor module are disposed next to each other such that a neutral direct current terminal of the first switching branch-specific semiconductor module is adjacent to a neutral direct current terminal of the second switching branch-specific semiconductor module.

12. The method of claim 11, wherein an alternating current terminal of the first switching branch-specific semiconductor module and an alternating current terminal of the second switching branch-specific semiconductor module are located on the same side of the switching branch.

13. The method of claim 11, wherein a positive direct current terminal of the first switching branch-specific semiconductor module and a negative direct current terminal of the second switching branch-specific semiconductor module are located on the same side of the switching branch.

14. A computer program product comprising computer program code embodied on a non-transitory computer readable medium, wherein execution of the program code on a computer causes the computer to carry out the steps of the method according to claim 10.

* * * * *